United States Patent
Vaidya et al.

(10) Patent No.: US 9,577,905 B2
(45) Date of Patent: *Feb. 21, 2017

(54) PACKET TRACING THROUGH CONTROL AND DATA PLANE OPERATIONS

(71) Applicant: Brocade Communications Systems, Inc., San Jose, CA (US)

(72) Inventors: Nikunj Vaidya, Milpitas, CA (US); Vardarajan Venkatesh, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/689,728

(22) Filed: Apr. 17, 2015

(65) Prior Publication Data

US 2015/0222510 A1 Aug. 6, 2015

Related U.S. Application Data

(63) Continuation of application No. 13/786,604, filed on Mar. 6, 2013, now Pat. No. 9,088,496.

(60) Provisional application No. 61/650,380, filed on May 22, 2012, provisional application No. 61/612,123, filed on Mar. 16, 2012.

(51) Int. Cl.
*H04L 12/26* (2006.01)
*H04L 12/24* (2006.01)

(52) U.S. Cl.
CPC ....... *H04L 43/0847* (2013.01); *H04L 41/0686* (2013.01); *H04L 43/10* (2013.01)

(58) Field of Classification Search
CPC ...... H04L 41/0873; H04L 41/12; H04L 41/20; H04L 41/26; H04L 43/00; H04L 43/10
See application file for complete search history.

(56) References Cited

U.S. PATENT DOCUMENTS

| | | |
|---|---|---|
| 5,844,902 A | 12/1998 | Perlman |
| 6,055,561 A | 4/2000 | Feldman |
| 6,137,797 A | 10/2000 | Bass |
| 6,347,334 B1 | 2/2002 | Fredericks |
| 6,363,077 B1 | 3/2002 | Wong |
| 6,538,997 B1 | 3/2003 | Wang |
| 6,671,257 B1 | 12/2003 | Soumiya |
| 6,687,228 B1 | 2/2004 | Fichou |
| 6,775,692 B1 | 8/2004 | Albert |

(Continued)

OTHER PUBLICATIONS

"Trace Route and Ping," McDATA (TM) Core-To-Edge Enterprise Solutions A Power Point Presentation by Scott Kipp, Aug. 12, 2003, 16 pages.

*Primary Examiner* — Gary Mui
*Assistant Examiner* — Stephen Steiner
(74) *Attorney, Agent, or Firm* — Blank Rome, LLP

(57) ABSTRACT

Improved debugging capabilities for network packet path tracing. Embodiments trace both the control and data planes. During control plane operations each switch appends its identity to the payload, providing a full trace of the control plan path. Responses containing the forward path payload are provided back at each hop, the responses being routing back by tracing back the forward direction control plane. The data plane is monitored by setting traps along the control plane path, with responses at each hop that indicate a given switch has been used being returned along the control plane path.

11 Claims, 11 Drawing Sheets

(56) References Cited

U.S. PATENT DOCUMENTS

| | | |
|---|---|---|
| 6,917,986 B2 | 7/2005 | Mor |
| 7,111,105 B2 | 9/2006 | Shah |
| 7,206,288 B2 | 4/2007 | Cometto |
| 7,289,436 B2 | 10/2007 | Schaller |
| 7,310,423 B2 | 12/2007 | Hobrock et al. |
| 8,050,180 B2 | 11/2011 | Judd |
| 8,179,808 B2 | 5/2012 | Valdevit |
| 9,014,013 B2 * | 4/2015 | Durrani ............... H04L 43/50 370/244 |
| 9,088,496 B2 * | 7/2015 | Vaidya ............... H04L 43/10 |
| 2002/0041594 A1 | 4/2002 | Suzuki |
| 2003/0099194 A1 | 5/2003 | Lee |
| 2003/0137978 A1 | 7/2003 | Kanetake |
| 2003/0174699 A1 | 9/2003 | Van Asten |
| 2004/0057389 A1 | 3/2004 | Klotz |
| 2004/0085994 A1 | 5/2004 | Warren |
| 2004/0158636 A1 | 8/2004 | Nakagawa |
| 2004/0196787 A1 | 10/2004 | Wang |
| 2005/0053006 A1 | 3/2005 | Hongal |
| 2005/0083949 A1 | 4/2005 | Dobbins |
| 2005/0086368 A1 | 4/2005 | Winter |
| 2005/0286551 A1 | 12/2005 | Berman |
| 2006/0007869 A1 | 1/2006 | Hirota et al. |
| 2009/0028128 A1 | 1/2009 | Trott |
| 2009/0161567 A1 | 6/2009 | Jayawardena et al. |
| 2011/0064078 A1 | 3/2011 | Jain et al. |
| 2011/0286447 A1 | 11/2011 | Liu |

* cited by examiner

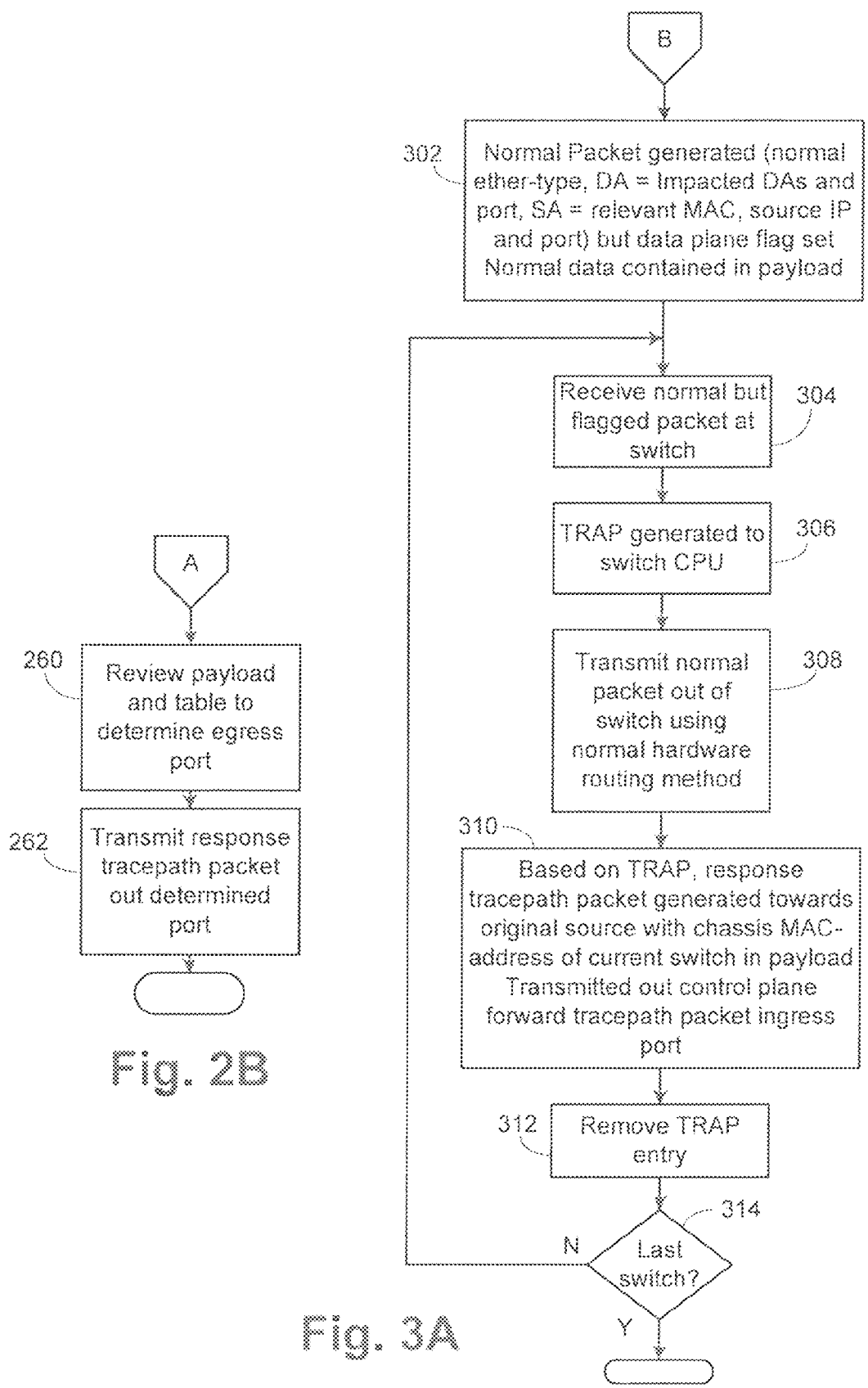

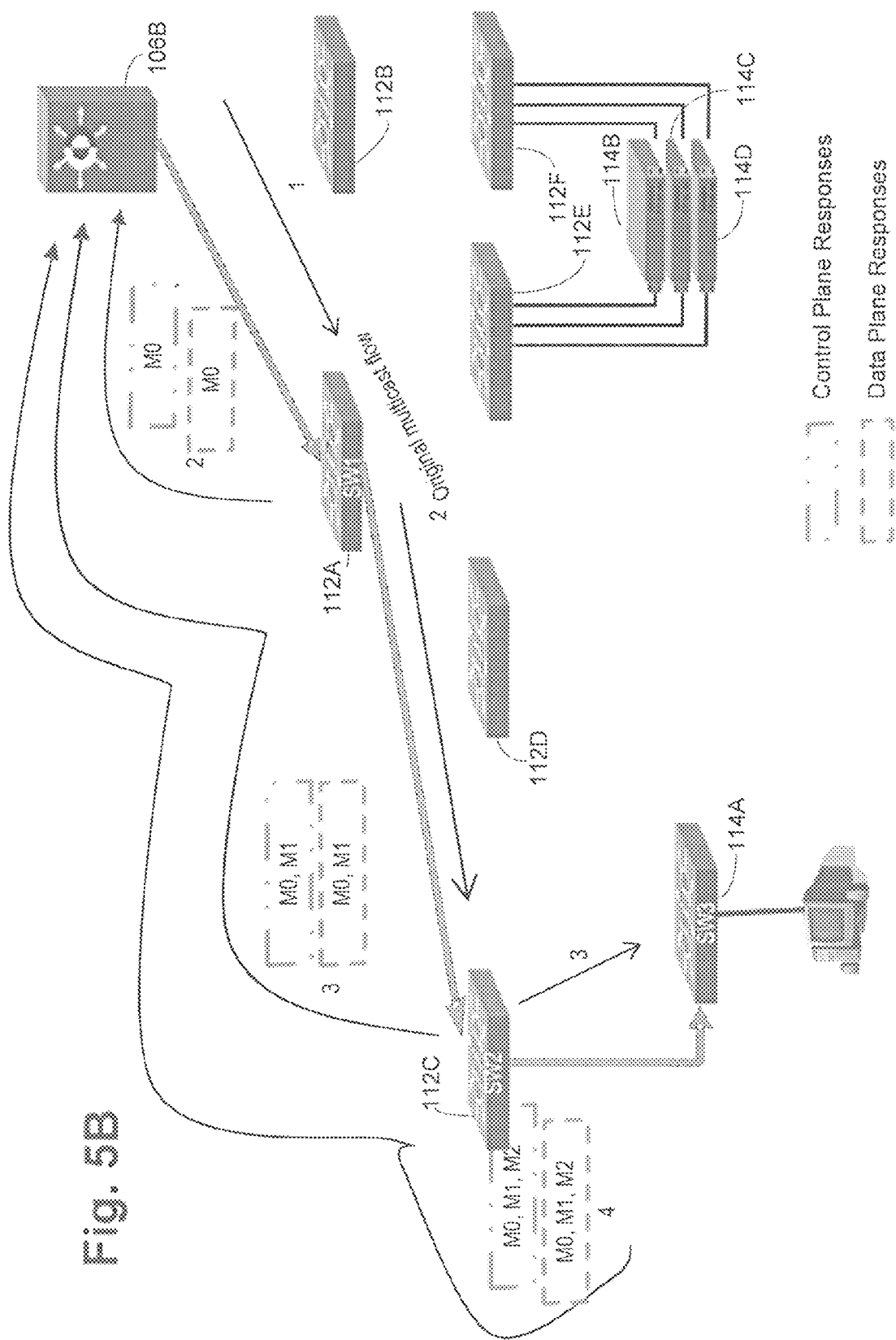

PACKET TRACING THROUGH CONTROL AND DATA PLANE OPERATIONS

RELATED APPLICATIONS

This application is a continuation of U.S. application Ser. No. 13/786,604, entitled "Packet Tracing through Control and Data Plane Operations" filed Mar. 6, 2013, which claims benefit to U.S. Provisional Application Ser. No. 61/612,123, entitled "B1-L2-Traceroute," filed Mar. 16, 2012 and U.S. Provisional Application Ser. No. 61/650,380, entitled "Debugging Framework," filed May 22, 2012, all of which are incorporated by reference.

BACKGROUND OF THE INVENTION

1. Field of the Invention

The present invention relates generally to networks, and more particularly to tracing paths of packets through a network.

2. Description of the Related Art

The industry is moving towards large layer-2 networks, using virtualized topologies such as fabrics, multi-chassis trunking (MCT) and virtual link aggregation groups (vLAG) to hide complexity. To debug these networks, the customer needs to uncover the complexity and trace the packet. However, this debugging is cumbersome and impractical today. This causes the customer to escalate the problems to the vendors. Studies have shown that very high percentages of these escalations involve packet loss and in each case the great majority of the time is spent identifying the culprit network node. Even for the vendors there is a lack of industry tools to easily debug layer-2 networks along the forwarding path as often multiple tools are needed to trace a single end-end layer-2 path. Indeed, there is no mechanism to locate layer-2 loops. The debugging is made more complicated because many problems have the same symptoms. Further, as the problems are present on production networks, no configuration changes can be done, there is live production background traffic and there is limited time to do the debugging.

Table 1 is a table of various debugging tools, their functionality and how specific situations are handled.

TABLE 1

| Tools | Functionality | L2 Loops | Blackhole scenarios | Debugging BUM (Broadcast, Unicast, Multicast) tree |
|---|---|---|---|---|
| Ethernet OAM (Operations, Administration, and Maintenance) (802.1ag/CFM (Connectivity Fault Management)) | Link-trace to trace L2 path. Mainly used between SP's. | Limited | Cannot trace forwarding path hashed based upon packet headers | Limited |
| Brocade L2 Traceroute | Limited support for tracing L2 packet path, specific to a product line | VDX: N/A MLX: Limited | VDX: Edge-port forwarding not validated MLX: Does not validate forwarding path | VDX: No support MLX: Limited |
| Cisco Traceroute mac | CDP (Cisco Discovery Protocol) based, does not apply to virtual networks | Limited | Does not verify forwarding path | Does not cover flooding scenario |
| ACL, SPAN & interface statistics | Common tools, but cumbersome to trace packet path | Operator should know the problematic link to capture data | Operator should know the problematic link to capture data | Impractical in a failure scenario |
| Edge Loop Detection | Detect loops based upon its returned heartbeat | Detects, but does not locate | May detect loops, but does not locate | Flooding loops detect, but not locate |

Therefore it would be desirable to be able to more easily and completely debug packet flows in a network.

SUMMARY OF THE INVENTION

In an embodiment according to the present invention, a tracepath packet, a new diagnostic packet, is formed in a source device such as a switch. The forward tracepath packet is addressed with the MAC addresses, IP addresses, and UDP or TCP ports of the desired source and destination. By using the exact addresses and ports of the packets that are having problems, the complete path can be traced, as load balancing algorithms will operate in the same manner. Because this is a special purpose packet, when it is received at each switch or router it is provided to the switch or router control processor for handling. For this discussion the term switch will generally be used but it is understood that routers, bridges, gateways and the like are encompassed by the term switch when such other device operates in a manner equivalent to that described herein for packet forwarding.

Because the tracepath packet is provided to the control processor, it traverses the network along the control plane, as opposed to the data plane where normal packet traffic flows.

Each switch performs four functions for forward tracepath packets. First, the switch places its identity in the payload of the packet, so that the forward packet will ultimately include the entire path traveled in the payload, and sends the forward tracepath packet to the next hop, with the process repeated at the next switch. In doing this payload appending operation, the switch also scans the payload looking for its own identity. If found, this indicates a loop exists and forward tracepath packet operations are terminated.

Second, the switch develops a response tracepath packet which includes the identity of the switch where the response packet is being sent from as well as the payload of the forward tracepath packet. This response tracepath packet is sent out the port where the forward tracepath packet was received, so that the response tracepath packet will go to the source of the forward tracepath packet. If a loop was detected, this error information is also placed in the payload. When a response tracepath packet is received at a switch, the switch parses the payload looking for the switch's own information placed in the forward tracepath packet to determine which port received the forward tracepath packet, which information is preferably included in the appended information in addition to the switch identity, so that the return response tracepath packet can be sent out that port. If the switch's identity is not present in the payload, the response tracepath packet is a data plane response tracepath packet and a table developed during the forward tracepath packet operations is consulted to determine the egress port. This process is repeated at each switch or until the original source is reached by the response tracepath packet. This use of the same port results in the response tracepath packet traveling the same route as the forward tracepath packet, which insures that it will reach the original source, thus avoiding potential forwarding errors. By using the payload from the forward tracepath packet at each hop, the original source will receive response tracepath packets from each hop until an error occurs, if any, with the path up to the point of loss provided in the last response tracepath packet received.

Third, the switch sets a trap or filter to detect a regular data path packet having the same addressing. Fourth, the relevant information from the forward tracepath packet is stored in the table to allow response tracepath packet routing for data plane response tracepath packets to be identical to the forward tracepath packet route.

When the forward tracepath packet has traversed the path and no more response tracepath packets are received by the original source for a pre-determined period of time or a response tracepath packet including a "last-switch" indication is received, the original source develops a normal packet having the same addressing, except that a flag or marker is set to indicate the data plane packet of the debug operation. As this is a normal packet, it will be forwarded along the data plane rather than the control plane as was done for the forward tracepath packet. The normal packet is then transmitted into the network from the same port as the forward tracepath packet. The normal packet then follows the data plane path to the destination. As, during the control plane operations, each switch along the control plane path will have set the trap or filter, when the normal packet is received at the switch, the trap is triggered. The normal packet continues along the data plane path. The trap causes the switch to remove the trap to prevent denial of service problems when normal operations are resumed and to develop a new response tracepath packet which includes the identity of the switch developing the response tracepath packet in the payload. Thus data plane response tracepath packet is transmitted from the port identified in the table as the port receiving the forward tracepath packet. As this happens at each switch that both the forward tracepath packet and the normal packet traversed, the original source receives a response tracepath packet at each hop of the normal packet, so that the last data plane response tracepath packet received contains the last switch in the path until an error condition occurred, if any. Should the control plane path and the data plane path diverge, then the point of divergence will be detected as the next hop in the forward direction after the last switch identified in the last data plane response packet.

When broadcast or multicast packets need to be analyzed, the above operations could result in a flood of response tracepath packets to the original source. To simplify operation under those conditions, only selected switches in the network will have the capability enabled, as opposed to the prior example where it was assumed that the capability was enabled in all switches. This reduces the number of response tracepath packets to a more manageable number. To get the entire flooding tree, different switches can be enabled and the same packet addressing used until all switches have been used. The results can then be merged to reveal the overall paths.

As can be seen, the above operations verify both the control and data planes, rather than just the control plane in the prior art. Blackholes are readily detected based on determining and evaluating the last response tracepath packet in either plane. Layer 2 loops are readily detected. BUM (broadcast, unicast, multicast) packets can be used to allow full BUM tree analysis. The operations can be done without reconfiguring the network or stopping normal production operations, other than the operation being debugged. This allows debugging to be done during normal hours and as desired, not on a scheduled basis. In addition, the nature of the response tracepath packets allows the customer, rather than the vendor, to perform the majority of the debugging. The operations also work through the newer topologies such as fabrics, vLAGs and MCTs.

While it is desirable that all switches include the capability, if there are intervening switches that do not implement the capabilities, the operations will continue at the next compliant switch, with a hop count value being used to make sure that the tracepath packets do not have an infinite life in a problematic network. The debugging software has the capability to receive the desired address information, the ability to develop the forward tracepath packets and the flagged normal packet with that addressing information at the desired injection point and the ability to receive and display the response tracepath packet payload information.

BRIEF DESCRIPTION OF THE DRAWINGS

The present invention has other advantages and features which will be more readily apparent from the following detailed description of the invention and the appended claims, when taken in conjunction with the accompanying drawings, in which:

FIG. 2B is a flowchart of response tracepath packet operation in the control plane according to the present invention.

FIG. 3A is a flowchart of operation in the data plane according to the present invention.

FIGS. 5A-5C illustrate IP multicast tracing according to the present invention.

DETAILED DESCRIPTION

Figure 1:
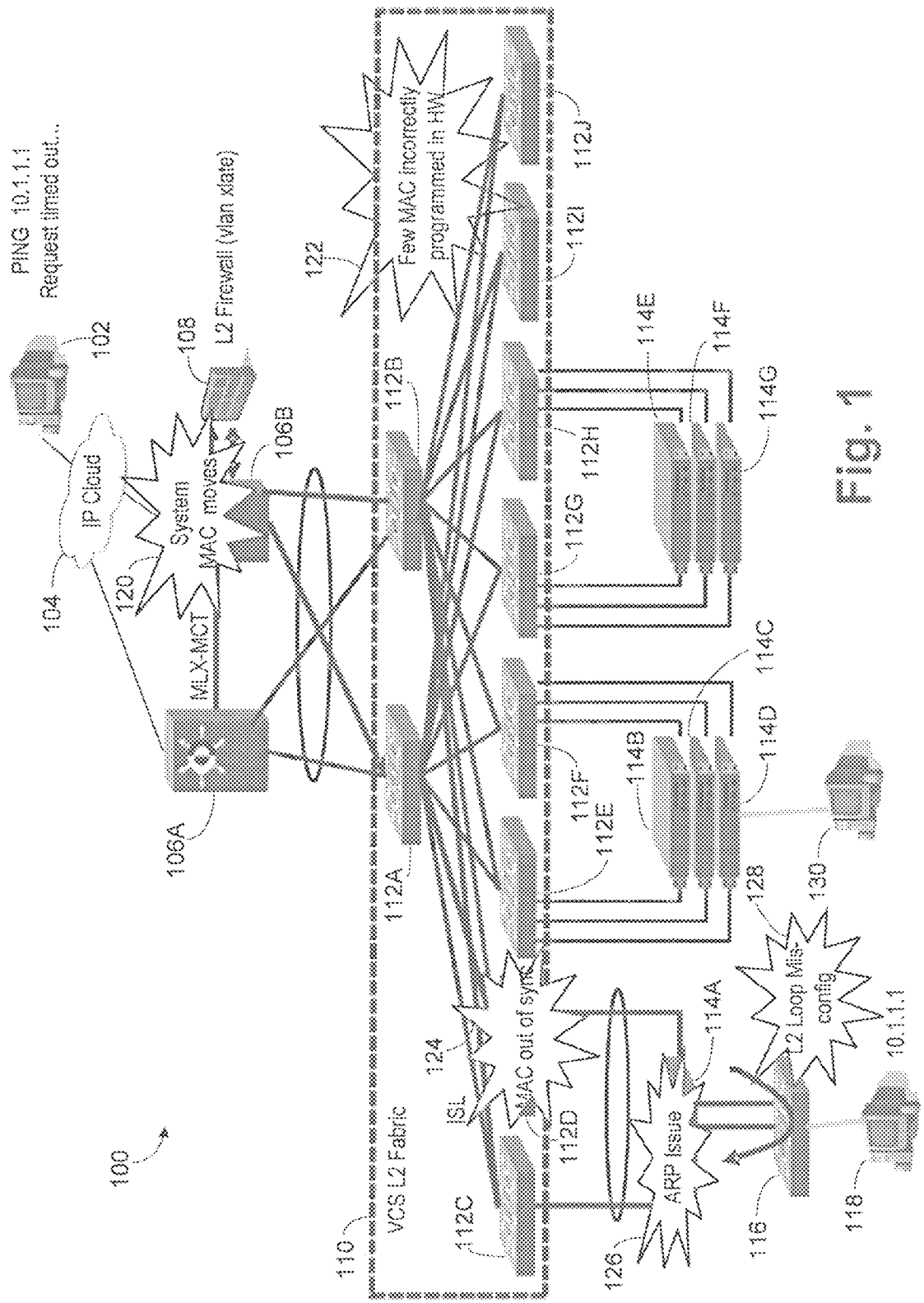
FIG. 1 illustrates a network with selected problems in various locations.

Referring now to FIG. 1, an exemplary network 100 is shown. An external workstation 102 is connected to an IP cloud 104, such as the Internet, which in turn is connected to routers 106A, 106B. The routers could be MLX routers from Brocade Communications Systems, Inc. (Brocade). A Layer 2 firewall 108 performs VLAN translations and other firewall functions and is connected to the routers 106A, 106B. The routers 106A, 106B are connected to a Layer 2 fabric no, such as the VCS fabric from Brocade. The Layer 2 fabric no is formed by a series of switches 112A-J, example switches being VDX switches from Brocade. A series of stackable edge switches 114A-G are illustrated as being connected to the Layer 2 fabric no. Example stackable edge switches are FCX switches from Brocade. Another switch 116 is connected to switch 114A in the example to provide a switch connected to a local workstation 118.

In the illustrated embodiment external workstation 102 pings the local workstation 118 but the ping request times out, indicating an error somewhere in the network 100. Five errors are shown as being present in the network 100. The first error 120 is that the System MAC has been permanently moved from router 106A to 106B due to a layer-2 loop. This would potentially cause black-holing of traffic. A second error 122 is that a number of the MACs in the switches 112A-G that form the Layer 2 fabric no are incorrectly programmed. A third error 124 is that one of the MACs on switch 112D is out of synchronization with the remainder of the switches 112. A fourth error 126 is that switch 114A has an ARP table error. The fifth error 128 is a layer 2 loop misconfiguration inside switch 116. The first four errors 120-126 could result in blackholes, causing the ping from external workstation 102 to be lost. The layer 2 loop error 128 will simply trap the ping until the ping times out. These are examples of the errors discussed in the Background that are very hard to diagnose and debug.

A management station 130 is connected to the network 100 to allow interaction with the various routers and switches.

In the preferred embodiment a user operating a management workstation 130 connected functionally to a router 106B would use a tracepath command of the following syntax. The tracepath command can be provided through a proprietary interface or API with a management program, a CLI (command line interface) or through a more standardized messaging interface such as one based on the OpenFlow standard. Depending upon the issue being debugged, the tracepath command can be sent to access, aggregation (fabric) or core layer switches or routers, with that switch or router controlling debugging operations and transmitting and receiving relevant packets. The below scenario gives example of entering the command on core switches or routers.

MLX# tracepath<l2 hdr> <l3 hdr> <l4 hdr> <vlan> <hop-count> <switch-names><Priority> <in-port>

MLX# is the originating switch identifier, such as that of router 106B. tracepath is the command. <l2 hdr> is the MAC addresses of the source and destination, such as the MACs of external workstation 102 and local workstation 118. <l3 hdr> is the IP addresses of the source and destination. <l4 hdr> is the ports, such as TCP or UDP, of the source and destination. <vlan> is the relevant VLAN. <hop-count> is conventional. <switch-names> is a list of switches to be enabled for this operation. The default is all switches. <Priority> identifies the priority of the packet, to allow priority-based debugging as well. <in-port> is the specific input port of the originating switch, such as the port connected to the IP cloud 104 in the example of FIG. 1.

Figure 2:
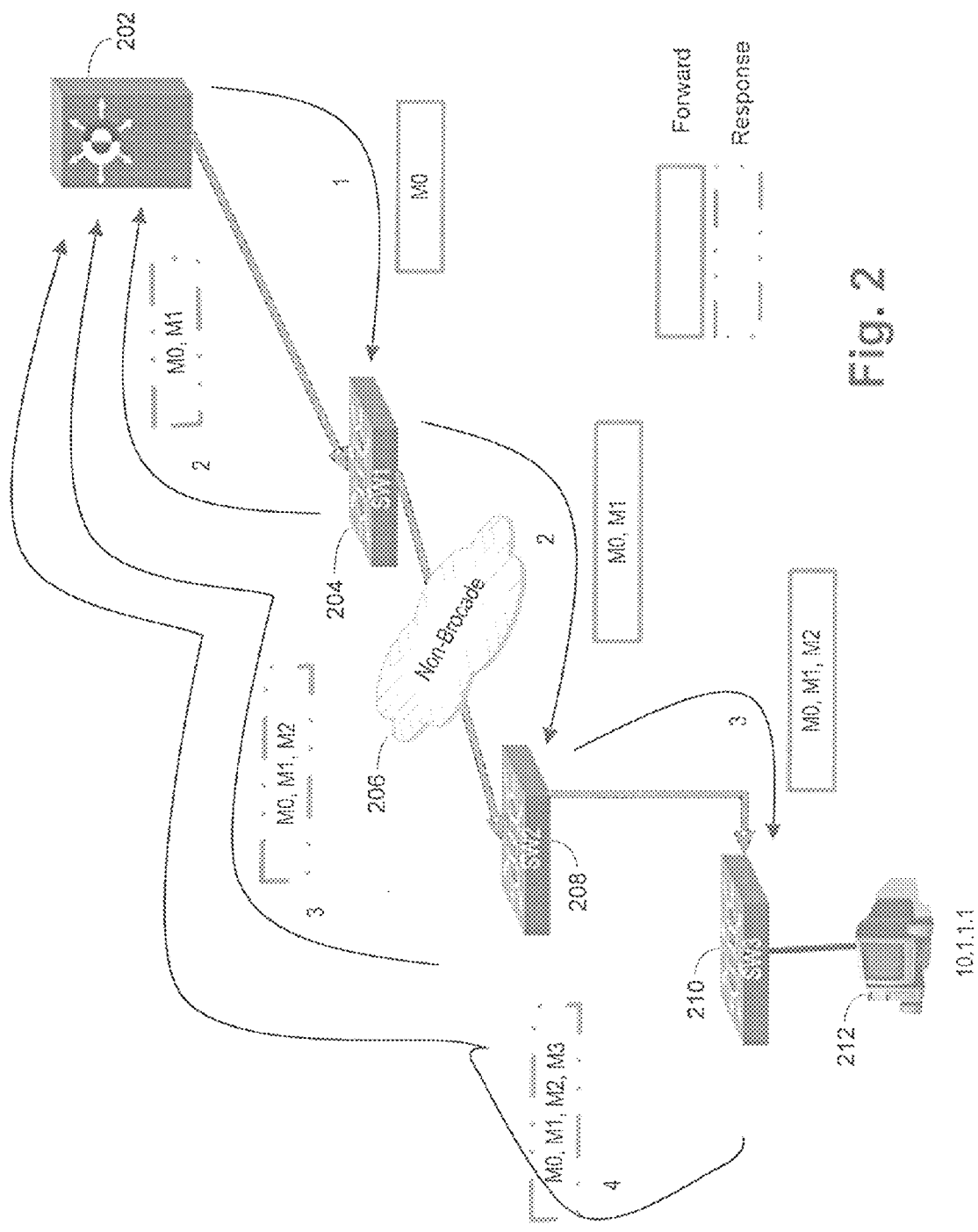
FIG. 2 illustrates control plane tracepath packet tracing according to the present invention.
Figure 2A:
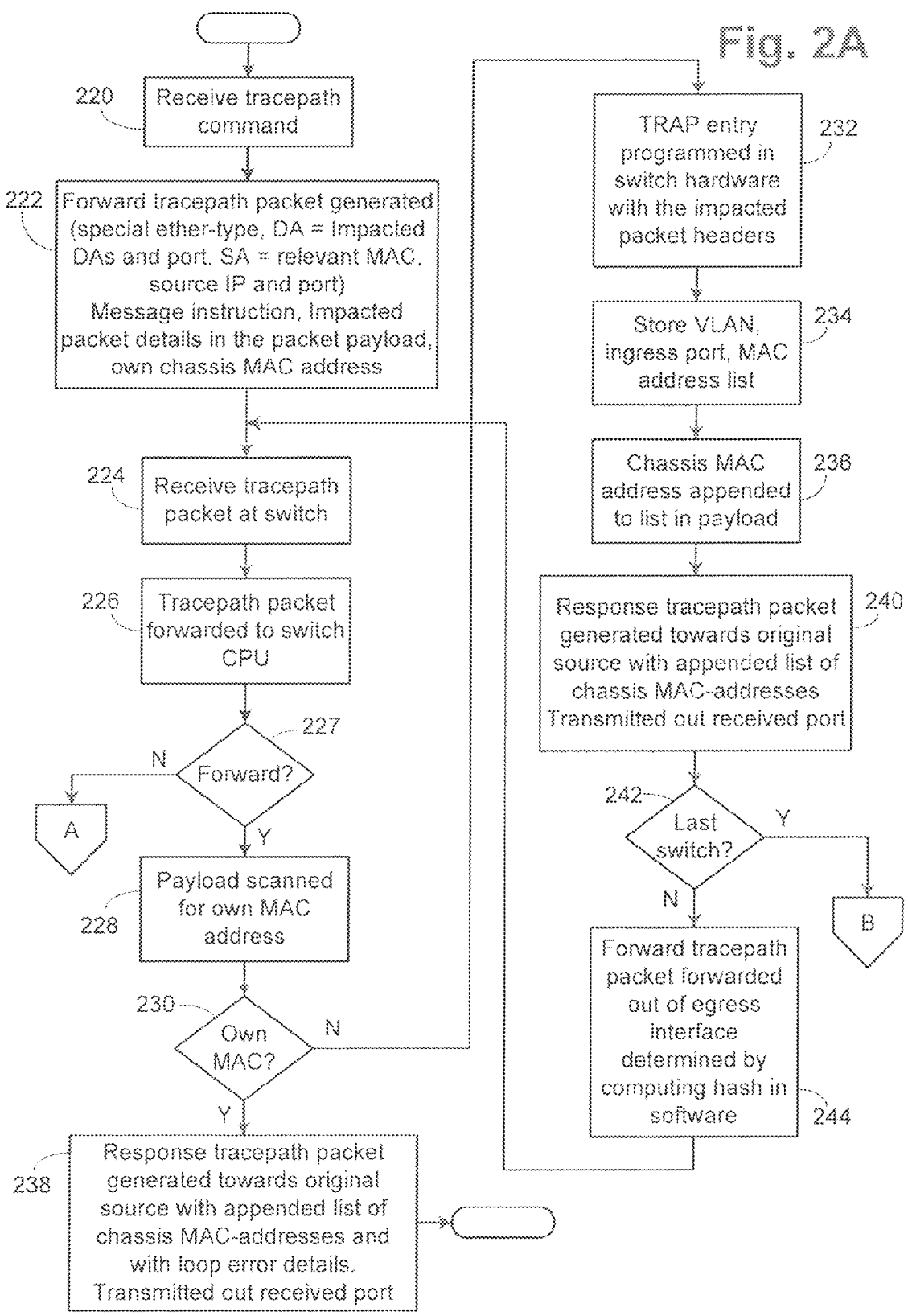
FIG. 2A is a flowchart of forward tracepath packet operation in the control plane according to the present invention.

Operation according to the preferred embodiment starts at FIGS. 2, 2A and 2B. In step 220, the source router 202 receives the tracepath command from the management station 130. In step 222, the forward diagnostic tracepath packet is generated. A special ethertype is preferably used to denote the tracepath packet, though other markers could be placed in various portions of the headers. The destination addresses, layer 2, layer 3 and layer 4, are based on the impacted device, such as workstation 212. It is understood that not all three layer addresses need be provided in operation and that in an alternate embodiment masks could also be used for each address. The source addresses, again layer 2, layer 3 and layer 4, are the router 202 MAC address and the impacted source layer 3 and layer 4 values, as provided in the tracepath command, as the router would have replaced the MAC address of the actual source, such as an external workstation but layer 2 and 3 addresses would be unchanged. If the originating device is a switch instead of a router, the source MAC address would be different, such as that of the relevant router if the impacted device is beyond the router or the source MAC address if on the same layer 2 network segment. The tracepath packet type is provided in the payload, along with any desired details on the impacted packet, the chassis MAC address and/or switch name (indicated as M0 in the hop from switch 202 to switch 204) and optionally the egress or output port information. A flag can be set in the packet to indicate a forward direction packet if only a single ethertype is to be used for the forward and response packets. This packet is provided to the switch 204.

At step 224 a tracepath packet is received at the switch 204. The packet processor 706 (FIG. 7) of the switch port forwards the tracepath packet to the switch CPU 710 upon detection of the ethertype indicating the tracepath packet in step 226. In step 227 the CPU 710 determines if the tracepath packet is a forward packet or a response packet. If a forward packet, in step 228 the CPU 710 scans the payload looking for its own MAC address, indicating a loop condition.

In step 230, if the own MAC address is not found, then in step 232 a TRAP entry is programmed into the switch hardware 702, such as in the packet analysis module 734. The TRAP entry is looking for a normal packet with the same headers as the forward tracepath packet and preferably with a flag set. The TRAP entry is preferably set with an expiration value so that the TRAP entries get automatically removed if the data plane portion of the operations do not occur. In step 234, the VLAN information, ingress port and MAC address list from the payload are stored in a table to allow a return or response tracepath packet to be provided out the same port on the same VLAN. In step 236 the switch's chassis MAC address and/or switch name is appended to the payload to allow tracking of the hops. The ingress and egress port information can be added if desired. This appending is shown in FIG. 2 as the addition of a value in the payload, such as M0 in the first hop, M0, M1 in the second hop and M0, M1, M2 in the third hop.

In step 240 a response tracepath packet is generated by the CPU 710. The response tracepath packet reverses the source and destination addresses of the forward tracepath packet and has the payload of the forward tracepath packet, including the information on the instant switch. The payload is shown in FIG. 2 as the numbers in the packet, such as M1, M0 in the hop from switch 204 to switch 202. The response tracepath packet is sent out the ingress port where the forward tracepath packet was received. In an alternate embodiment, step 240 is performed before step 236 so that the response tracepath packet payload does not contain the information of the switch generating the response tracepath packet. For example in FIG. 2, the M1 would not be present in the packet from switch 204 to switch 202. In this embodiment the identity of the originating switch, such as switch 204, can be determined by analyzing the layer 2 source address of the response tracepath packet.

In the illustrated case, the forward tracepath packet traverses a non-Brocade portion 206 of the network. This is exemplary for any portion of the network that must be traversed and that does not comprehend the tracepath packet. The above operations from step 224 are performed by the next switch, such as switch 208, and then the next switch, such as switch 210. This repeated operation is illustrated in FIG. 2A as a determination of whether the last switch has been reached in step 242. If not, the operation proceeds to step 244, where the updated forward tracepath packet is forwarded out the proper egress port based on the hash operations that are in place, with the hash being performed by the CPU 710 in software as the packet will actually be directly placed in the egress port after the switch routing hardware. Operation then returns to step 224, effectively the operation of the next switch.

Returning to step 230, if the switch's own MAC address was found, in step 238 a response tracepath packet is generated as above in step 240 except a code indicating the loop error is also placed in the payload. Because of the error, the debugging operation stops after step 238. The set TRAP entries will expire based on their timer values, so no data plane operations are required.

If it was determined in step 227 that the tracepath packet was a response packet and not a forward packet, then in step 260 the CPU 710 reviews the packet payload and potentially the table of stored information, the VLAN information, the ingress port and the MAC address list as stored in step 234, to determine the egress port and VLAN for the response tracepath packet. If this is a control plane response tracepath packet, the payload contains the switch information of the prior hops. Thus, the switch information, which preferably includes the ingress and egress ports, of the present switch should be present. As a result, the stored ingress port can be used as the egress port for the response tracepath packet. If this is a data plane response tracepath packet, information of a single switch is present, not the present switch. Therefore, the switch CPU 710 consults the stored list to determine the proper egress port. The response tracepath packet is then transmitted out that port in step 262. Thus the response tracepath packet will traverse the forward path in the reverse direction, insuring that the response tracepath packet will reach the originating source. When the originating source detects the packet, the originating source captures the packet and provides at least the payload and addressing information to the management station 130. The originating source or switch does not further transmit the response tracepath packet into the network, except partially as a payload of a packet to the management station 130.

For the example network of FIG. 2, response tracepath packets will be provided by switch 204, switch 208 and switch 210. The originating switch or router will forward the payloads of these responses to the management station 130 for review by the user. In the illustrated case of proper routing and no errors, the return of the three response packets will show that the forward tracepath packet would have reached the destination. If instead the response tracepath packet from switch 210 was not received by the originating switch, this would indicate a routing failure between switch 208 and switch 210, as the last response tracepath packet would have been received from switch 208. Thus a blackhole or lost packet is easy to trace as the last switch that successfully received the packet before the error is provided. The user can then quickly check just that switch for routing error sources. Thus the location of the blackhole is very naturally provided, greatly simplifying debug efforts.

Because all of the routing decisions described above were made by the switch CPU 710, this forward tracepath packet thus traverses the control plane, thereby checking the control plane routing tables and the like. However, data plane checking must also be done as the data plane routing and the control plane routing may not be the same, which could result in routing errors and lost packets.

Figure 3:
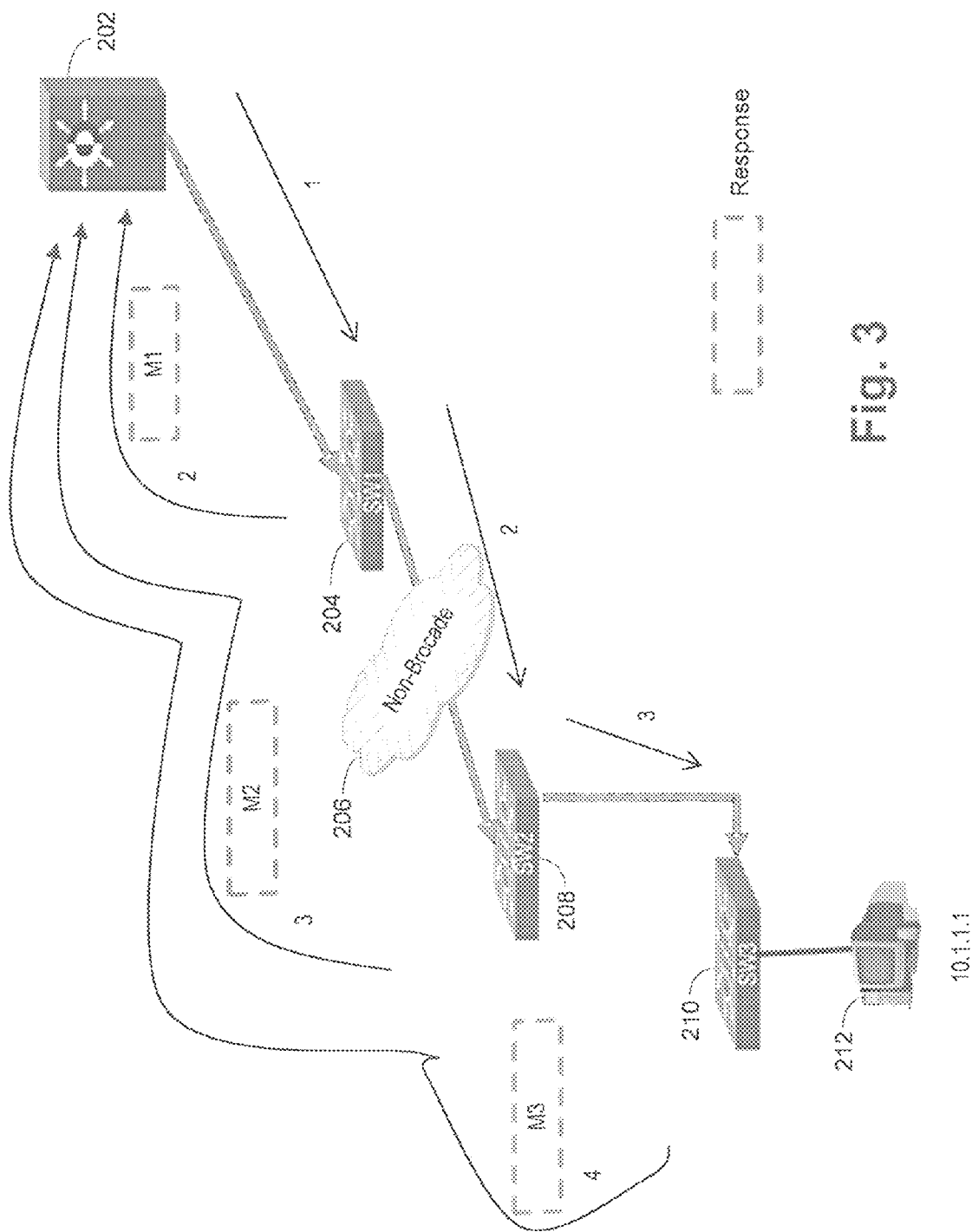
FIG. 3 illustrates data plane normal packet tracing and response tracepath packet according to the present invention.

Referring to FIGS. 3 and 3A, data plane diagnostic operation after the control plane operation of FIGS. 2, 2A and 2B is shown. If the last switch was reached in step 242, operation proceeds to step 302. In certain embodiments this last switch determination is actually done in each switch, either by checking the hop count or based on LLDP (link layer discovery protocol) or similar information, so that the last switch can also add a last switch indication in the payload of its response tracepath packet of step 240. Understanding that the last switch decision is just for explanatory purposes in some embodiments, step 302 would actually commence a sufficient period after the last response tracepath packet was received for those embodiments. If a specific last switch indication was placed in a response tracepath packet in the embodiment, then step 302 occurs after receipt of that packet. In step 302 a normal packet is generated in the switch 202. The addressing is the same as the forward tracepath packet of step 222 to test the data plane. A data plane flag is set in the normal packet, preferably on one of the header fields. A normal or nominal payload is used as there is no actual data to be transmitted, just the path of the normal packet monitored. The normal packet is then issued from the switch 202, as indicated by the straight arrow, as opposed to curved arrows which represent control plane operations. The normal packet is received at switch 204 in step 304. As the addresses of the packet match those previously set for the TRAP entry and the data plane flag is set, the TRAP is generated in step 306. The normal packet is next transmitted from the switch using the normal hardware routing operations in step 308. This allows testing of the hardware routing operations, as opposed to the control plane routing done previously.

In step 310 a response tracepath packet is generated based on the TRAP. The address is the original source, with the switch's MAC address placed in the payload. Only the MAC address of the one switch is present in this response tracepath packet as there is no opportunity to edit the payload as done in the control plane tracing, as the intent of this phase is to have the normal packet proceed along the normal hardware route. The response tracepath packet is transmitted out the same port as the control plane diagnostic packet was received, as true with the response tracepath packets in the control plane phase. In step 312 the TRAP entry is removed so that only the one use of the normal packet triggers the debugging response packet generation. If not removed and if normal operations resumed before the TRAP timer value expired, the TRAP might happen for each packet in normal operations, which should be avoided. In step 314 a determination is made if this is the last switch. As in step 242, this step is provided to illustrate that the same operations occur in each switch, not that the decision step itself is actually present. If not the last switch, operation returns to step 304 so that the next switch in the network performs the same operations and sends the response tracepath packet to indicate the next hop has been reached.

The switch 202 receives a response tracepath packet for each hop the normal packet travels that is the same as the control plane operation. This allows the data plane response tracepath packets with their payloads to be forwarded to the management system 130, which can then trace the path of the normal packet hop by hop. When no further response tracepath packets are received, the normal packet has either reached its destination or has been lost after the last switch that provided a response tracepath packet. Assuming the lost packet, debug analysis can begin at the last switch that provided a response tracepath packet as the packet got lost exiting that switch.

Management software on the management workstation 130 then displays the debugging test results as desired, such as simple textual tables or as full topology displays with the paths and switches of the control plane and data plane highlighted or emphasized, such as one or two different colors or the like.

The above discussion assumes that all switches in the network have the features enabled, unless otherwise indicated. This is useful in cases as discussed above, where individual source or destination addresses are of concern. However, if the problems being debugged are occurring in multicast or broadcast packets, having all of the switches enabled could easily overwhelm the originating switch. This problem is addressed by use of the <switches> option in the tracepath command described above. Only the desired switches are listed in the command, the remaining switches being disabled. This limits the number of response tracepath packets being provided. If the full trees are to be analyzed, this can be done by multiple executions of the tracepath command and varying the enabled switches based on the expected tree. The response tracepath packets from the multiple executions can then be combined to show the full tree results.

Figure 4:
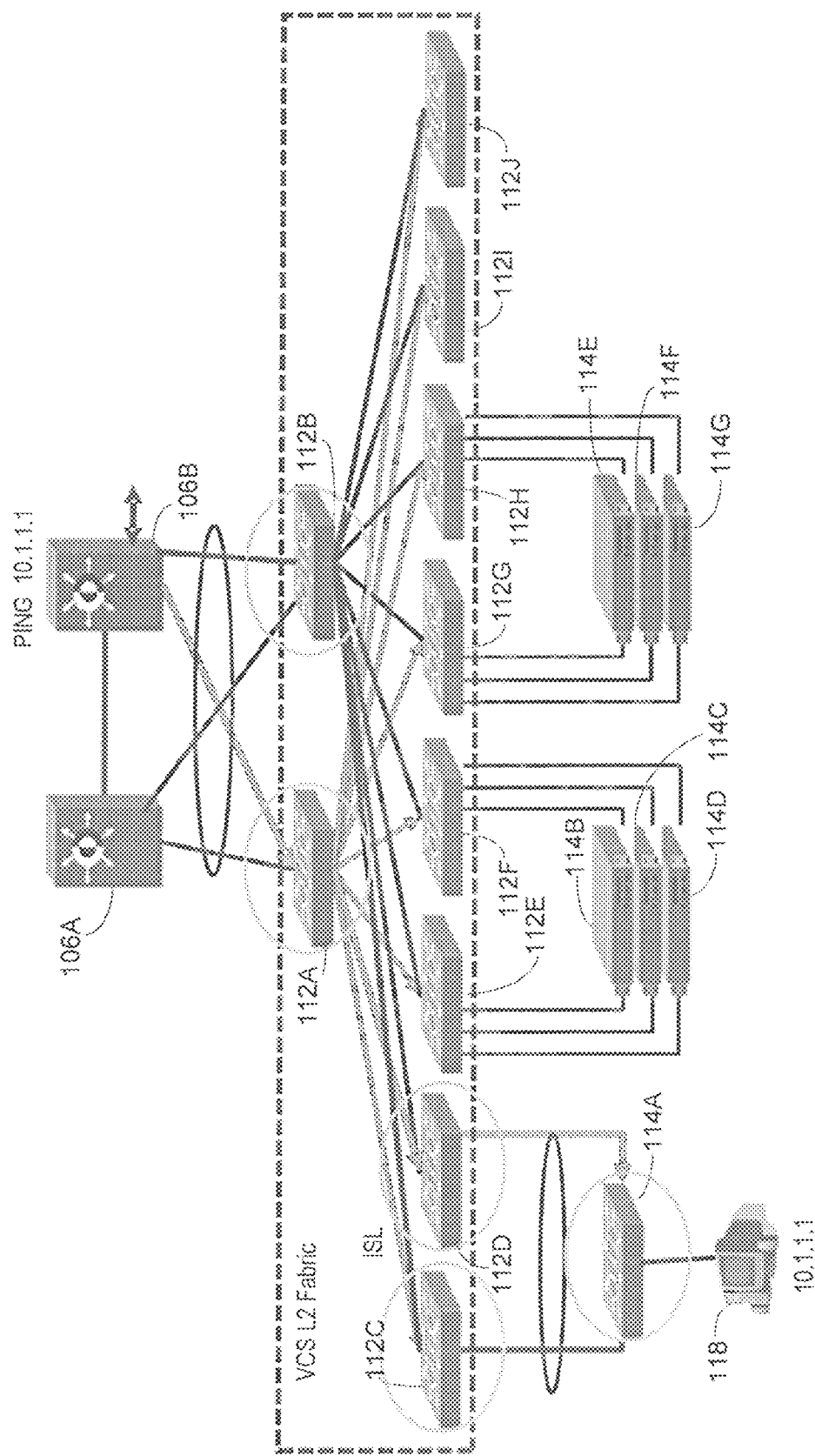
FIG. 4 illustrates flooding tree tracing according to the present invention.

An example is illustrated in FIGS. 4 and 5A-C. As a precursor, the tracepath command is issued such that the destination MAC address is a multicast or broadcast address and/or the destination IP address is a broadcast or multicast address. Further, the desired switches are listed in the <switch> portion of the command. In FIG. 4, the network of FIG. 1 is illustrated without the errors, and like switches receive like numbers. The switches of interest for the first phase are circled, namely switches 112A, 112B, 112C, 112D and 114A, which are enabled by the tracepath command. The remainder of the switches have the tracepath feature disabled due the operation of the tracepath command. The switches are enabled or disabled based on the presence of their names or identifying information being present in the packet payload, the names being added by the source based on the <switch-names> filed in the initial command. In the preferred embodiments the switches know to look for their name in this list based on a bit in the payload which indicates unicast mode, where each switch responds to the packet, or broadcast/multicast mode, where only the listed switches respond.

Figure 5A:
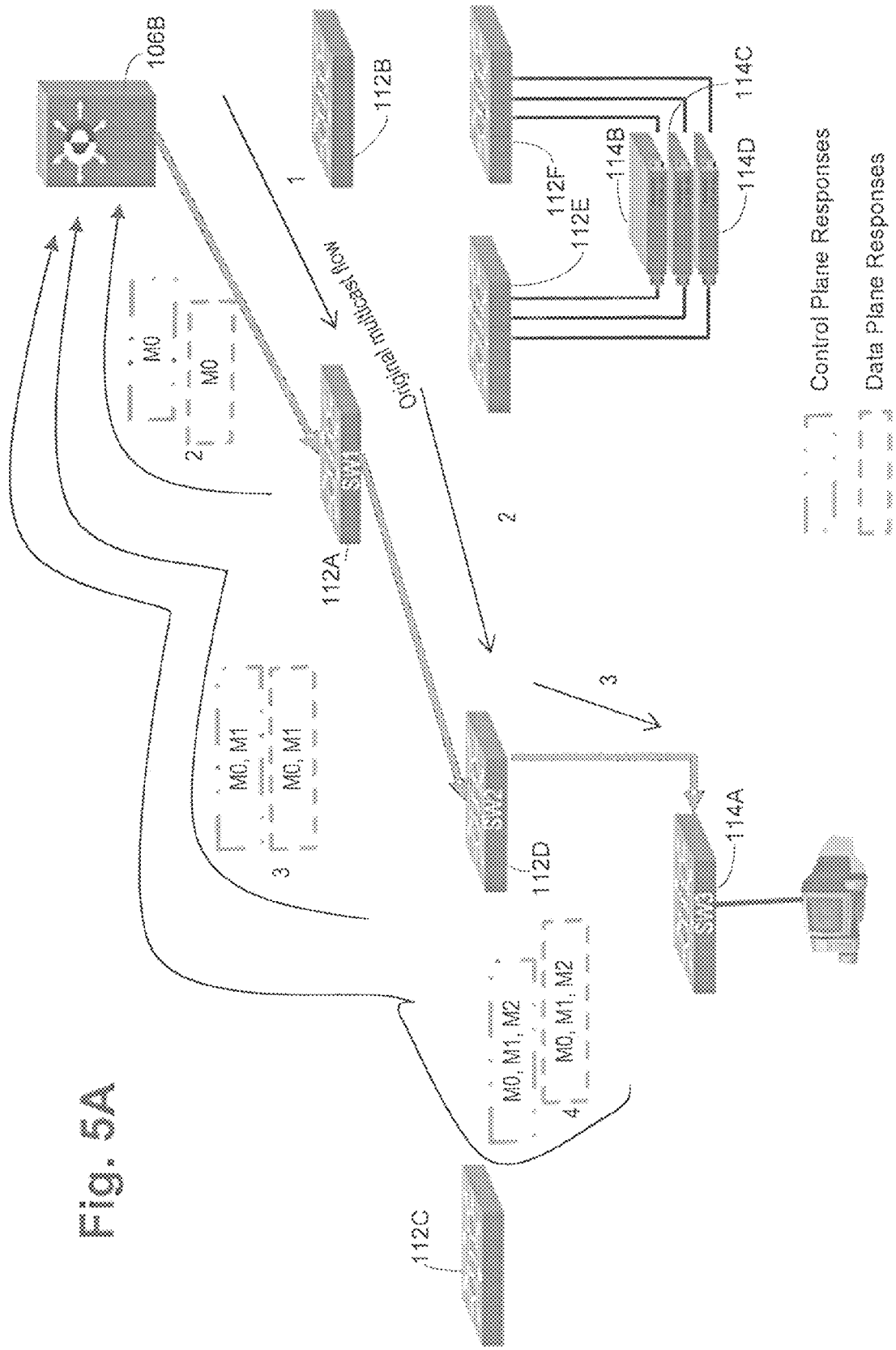
Figure 5C:
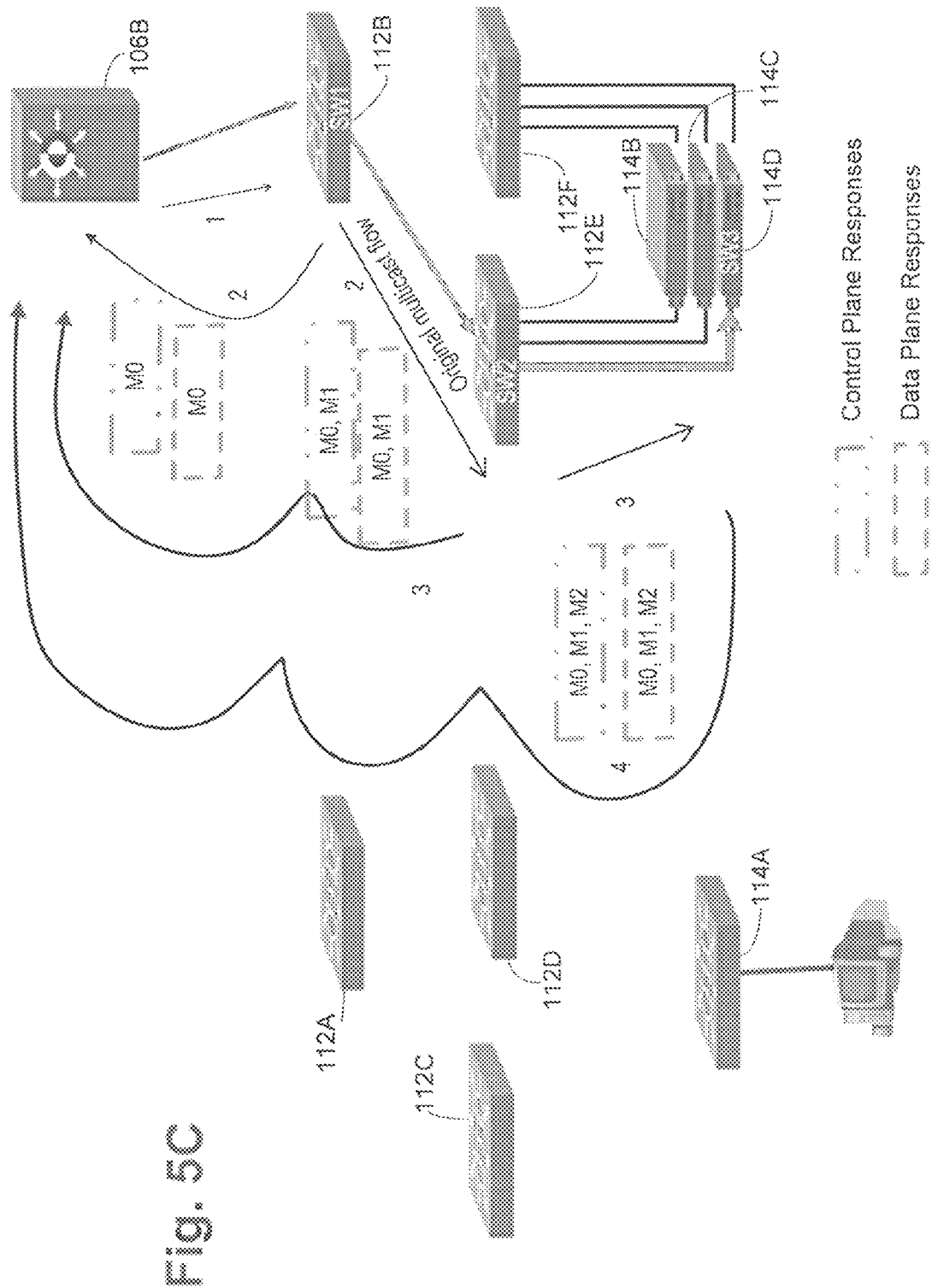

The operation is generally as described above for the specific unicast example, except the forward tracepath and normal packets are distributed to multiple switches in parallel and response tracepath packets are received from each. FIGS. 5A-5C illustrate three iterations of the control plane and data plane operations through three different sets of enabled switches, with the flow through the switches where tracepath functionality is not enabled not shown. FIG. 5A shows operation through switches 112A, 112D and 114A. FIG. 5B shows operation through switches 112A, 112C and 114A. FIG. 5C shows operation through switches 112B, 112E and 114D. It is understood that this can be done for all of the various switches if the full flooding pattern is desired or only for a lesser portion if the problem area of concern is more localized.

The management software on the management workstation 130 collects all of the responses and then either displays the results individually if desired or accumulates the results until all desired iterations have been completed, with the accumulated results then being displayed.

Figure 6:
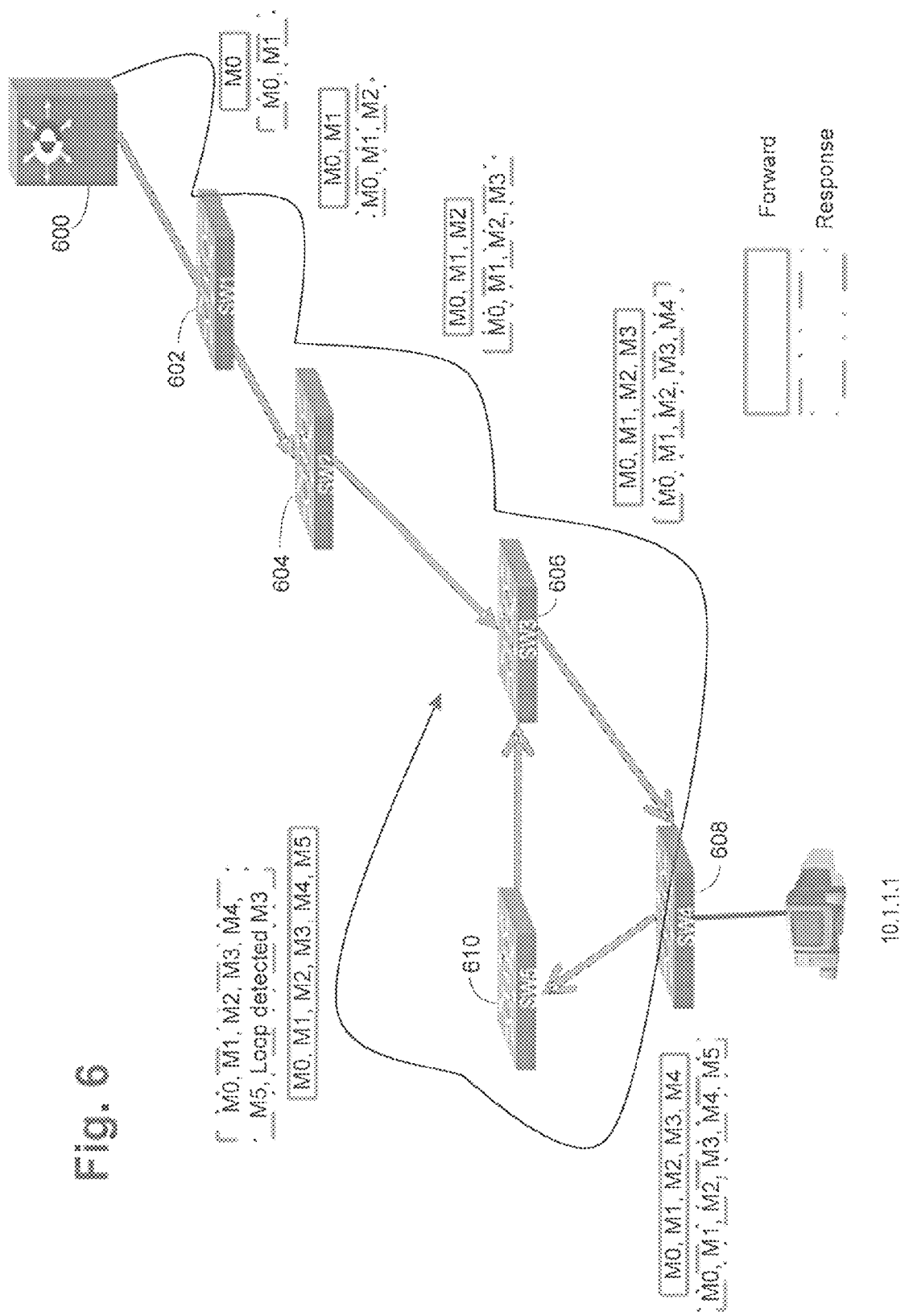
FIG. 6 illustrates layer 2 loop location according to the present invention.

The flowchart of FIG. 2A at steps 228, 230 and 238 cover the case of a layer 2 loop. That case is illustrated in FIG. 6. The forward tracepath packet hops forward one switch at a time, from switch 600 to switch 602 to switch 604 to switch 606 to switch 608 to switch 610 and then back to switch 606. Switch 606 detects its MAC address in the payload of the forward tracepath packet and thus detects the layer 2 loop error. The response tracepath packet that is generated includes the switch path up to switch 606 the second time and then an entry indicating the loop detection by switch 606. Switch 606 does not forward the forward tracepath packet, as debugging operations terminate due to the loop error. The existing TRAPs in switches 602, 604, 606, 608 and 610 expire based on their expiration time values.

Figure 7:
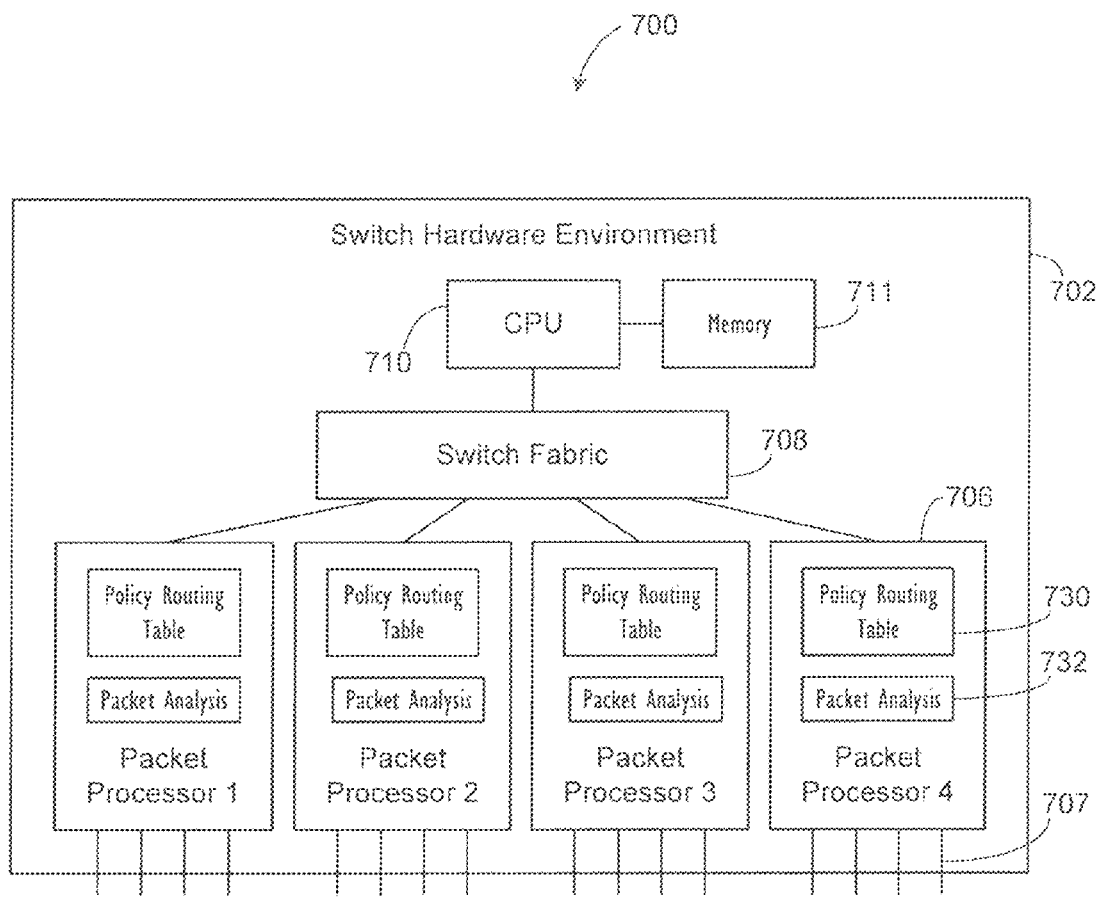
FIG. 7 illustrates an exemplary switch according to the present invention.

FIG. 7 illustrates an exemplary switch 700 according to the present invention. The switch hardware 702 includes a series of packet processors 706 which provide the switch ports 707. Each packet processor 706 includes a policy routing table 730 for routing packets and a packet analysis module 732, which analyzes packet headers and the like for desired information. The packet processors 706 are connected to a switch fabric 708 to allow packet switching. A switch CPU 710 is connected to the switch fabric 708 to allow packets to be forwarded from the packet processors 706 to the switch CPU 710 for further analysis and handling. A memory 711 is connected to the CPU 710 and holds program instructions executed by the CPU 710 to perform the various operations. In the preferred embodiments the packet processors 706 detect the received tracepath packets and forward them through the switch fabric 708 to the CPU 710. The new response tracepath packets are provided directly to the proper packet processor 706 using a control plane operation (not illustrated) so that the desired egress port can be assured. Alternatively, if the switch 700 uses shims or other additional information with each packet internally to transfer the routing information, the switch CPU 710 can use the switch fabric 708. The packet processors 706 also contain the TRAP logic, which causes an interrupt or similar message to be provided to the switch CPU 710. This is an exemplary switch architecture and many variations and further details are well known to those skilled in the art. Given the above description one skilled in the art can modify those variations to provide similar functionality to that described herein. In some of the variations certain operations described as being done by the CPU 710 may be done in hardware, such as developing the response tracepath packets, if the hardware is sufficiently advanced to provide hardware modules to perform the operations.

Embodiments according to the present invention provide improved debugging capabilities for network packet path tracing. Embodiments trace both the control and data planes. During control plane operations each switch appends its identity to the payload, providing a full trace of the control plan path. Responses are provided back at each hop, the responses being routing back by tracing back the forward direction control plane. The data plane is monitored by setting traps along the control plane path, with responses at each hop that indicate a given switch has been used being returned along the control plane path. Broadcast and multicast traffic is monitored by selecting particular switches to perform the above operations. Layer 2 loops are detected by each switch monitoring the control plane packets for presence of that switch in the payload. A management station collects the responses and provides an output for user analysis. Thus embodiments according to the present invention simplify path debugging and cover instances not previously covered. Further, the debugging operations can occur during production operation as the various packets are simply interspersed with the production traffic.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method comprising:
   receiving and detecting a tracepath packet at a device and providing said tracepath packet to a CPU of the device, said tracepath packet having addressing of packets being traced;
   transmitting said tracepath packet from the device;
   generating and transmitting a first response packet by the device, said first response packet including the device information as payload information and transmitted from a port where said tracepath packet was received;
   enabling detection of a tagged normal packet by the device based on the receipt of said tracepath packet, said tagged normal packet having the same addressing as said tracepath packet;
   receiving and detecting said tagged normal packet by the device after transmitting said first response packet;
   transmitting said tagged normal packet from the device;
   notifying the CPU of the device of the detection of said tagged normal packet; and
   generating and transmitting a second response packet by the device in response to said notifying, said second response packet including the device information as payload information and being transmitted from the port where said tracepath packet was received.

2. The method of claim 1, further comprising:
   receiving a first or second response packet from another device and transmitting said first or second response packet from the port where said tracepath packet was received.

3. The method of claim 1, further comprising:
   disabling detection of the tagged normal packet after receipt of the tagged normal packet.

4. A method comprising:
   receiving a command from a management device to transmit a tracepath packet at an originating device, said command indicating source and destination addresses of said tracepath packet;
   developing and transmitting said tracepath packet in response to said command by the originating device;
   receiving and detecting said tracepath packet at a switching device and providing said tracepath packet to a CPU of the switching device, said tracepath packet having addressing of packets being traced;
   transmitting said tracepath packet from the switching device;
   generating and transmitting a first response packet by the switching device, said first response packet including device information of the switching device as payload information and transmitted from a port where said tracepath packet was received;
   receiving said first response packet and transmitting at least said payload of said first response packet to the management device by the originating device;
   developing and transmitting a tagged normal packet after receiving said first response packet by the originating device, said tagged normal packet having the same addresses as said tracepath packet and including a tag;
   enabling detection of said tagged normal packet by the switching device based on the receipt of said tracepath packet;
   receiving and detecting said tagged normal packet by the switching device;
   transmitting said tagged normal packet from the switching device;
   notifying the CPU of the switching device of the detection of said tagged normal packet;
   generating and transmitting a second response packet by the switching device in response to said notifying, said second response packet including the switching device information as payload information and being transmitted from the port where said tracepath packet was received, and
   receiving said second response packet and transmitting at least said payload of said second response packet to the management device by the originating device.

5. The method of claim 4, wherein said steps of receiving and detecting said tracepath packet at a switching device, transmitting said tracepath packet, generating and transmitting a first response packet by the switching device, enabling detection of said tagged normal packet by the switching device, receiving and detecting said tagged normal packet by the switching device, transmitting said tagged normal packet from the switching device, notifying the CPU of the switching device of the detection and generating and transmitting a second response packet by the switching device are repeated for each switching device capable of performing such steps in the path from the originating device to a later device, and
   wherein said steps of receiving said first response packet and transmitting at least said payload of said first response packet to the management device and receiving said second response packet and transmitting at least said payload of said second response packet to the management device are performed for each received first and second response packet from each of the switching devices that transmit said first and second response packets.

6. The method of claim 5, wherein one of the addresses of said tracepath packet is a broadcast or multicast address, wherein said command further indicates a list of switching devices to be enabled to perform such steps so that switching devices not enabled are considered to not be capable of performing such steps, and wherein only indicated switching devices are enabled and remaining switching devices are not enabled.

7. The method of claim 4, further comprising:

receiving a first or second response packet from another switching device and transmitting said first or second response packet from the port where said tracepath packet was received.

8. The method of claim 4, further comprising:

disabling detection of the tagged normal packet after receipt of the tagged normal packet by the switching device.

9. A switch comprising:

a CPU;

memory coupled to and containing software instructions for said CPU;

a plurality of ports for receiving a tracepath packet, said tracepath packet having addressing of packets being traced, for transmitting a tracepath packet, for transmitting a first response packet from a port where said tracepath packet was received, for receiving a tagged normal packet, said tagged normal packet having the same addressing as said tracepath packet, and for transmitting said tagged normal packet and a second response packet, said second response packet being transmitted from the port where said tracepath packet was received; and at least one packet processor coupled to said CPU and to at least one of said plurality of ports to analyze packets received by said at least one of said plurality of ports, said at least one packet processor detecting said tracepath packet and providing said tracepath packet to said CPU, being enabled for detection and detecting said tagged normal packet and notifying said CPU of said tagged normal packet;

wherein said CPU operates to provide said tracepath packet to a port of said plurality of ports, to generate a first response packet including the switch information as payload information, to provide said first response packet to the port of said plurality of ports, to enable detection by said at least one packet processor of said tagged normal packet based on receipt of said tracepath packet, to generate a second response packet in response to said notifying and to provide said second response packet to a port of said plurality of ports, said second response packet including the switch information as payload information.

10. The switch of claim 9, wherein said plurality of ports further receive a first or second response packet from another device and transmit said first or second response packet from the port where said tracepath packet was received.

11. The switch of claim 9, wherein said CPU further operates to disable detection of the tagged normal packet by said at least one packet processor after receipt of the tagged normal packet.

* * * * *